United States Patent [19]

Noguchi et al.

[11] 4,132,212

[45] Jan. 2, 1979

[54] TORCH-IGNITION INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 782,512

[22] Filed: Mar. 29, 1977

[30] Foreign Application Priority Data

Apr. 2, 1976 [JP] Japan ................................ 51-37339
Apr. 14, 1976 [JP] Japan ................................ 51-42698

[51] Int. Cl.² .................... F02B 19/12; F02B 23/08
[52] U.S. Cl. ......................... 123/191 S; 123/32 SP; 123/32 ST; 123/148 C; 123/191 SP
[58] Field of Search ............. 123/30 B, 32 C, 32 K, 123/32 SA, 32 SP, 32 ST, 191 S, 191 SP, 193 CH, 193 H, 148 C, 148 DS

[56] References Cited

U.S. PATENT DOCUMENTS

| | | | |
|---|---|---|---|
| 1,555,809 | 9/1925 | Burtnett | 123/191 S |
| 3,776,212 | 12/1973 | Karlowitz | 123/32 ST |
| 3,809,042 | 5/1974 | Hosho et al. | 123/148 C |
| 4,029,075 | 6/1977 | Noguchi et al. | 123/32 ST |
| 4,038,959 | 8/1977 | Takaizawa et al. | 123/32 SP |
| 4,043,309 | 8/1977 | Kato et al. | 123/32 C |

FOREIGN PATENT DOCUMENTS 2647881  5/1977  Fed. Rep. of Germany ....... 123/148 C Primary Examiner—Charles J. Myhre
Assistant Examiner—Craig R. Feinberg
Attorney, Agent, or Firm—Cushman, Darby & Cushman

[57] ABSTRACT

A torch-ignition internal combustion engine has a trap chamber formed in the engine cylinder head and communicated with a main combustion chamber through a plurality of torch apertures. An intake port extends through the cylinder head to the main combustion chamber to feed a charge of an air-fuel mixture thereinto when an intake valve is open on an intake stroke of the engine. At least one of the torch apertures is positioned and directed relative to the downstream end of the intake port such that a part of the mixture charge to the main combustion chamber flows through the one torch aperture into the trap chamber during the intake stroke of the engine to simultaneously force out the residual gases produced during a preceding combustion stroke through the other torch aperture or apertures into the main combustion chamber. A part of the mixture fed into the main combustion chamber is forced through the torch apertures into the trap chamber on a succeeding compression stroke to urge any residual combustion gases in the main and trap chambers toward the inner part of the trap chamber remote from the main combustion chamber. A spark plug is mounted on the cylinder head such that the plug electrodes are disposed within the main combustion chamber adjacent to that end of one of the torch apertures which is open to the main combustion chamber to cause an initial spark-ignition of the mixture adjacent to the plug electrodes. The spark-ignition produces a fire which propagates into the trap chamber through the torch aperture adjacent to the plug electrodes whereby the mixture in the trap chamber is burnt to produce a combustion flame which spurts through all the torch apertures into the main combustion chamber to form strong torch jets for the torch-ignition of the mixture in the main combustion chamber.

15 Claims, 7 Drawing Figures

TORCH-IGNITION INTERNAL COMBUSTION ENGINE

BACKGROUND OF THE INVENTION

1. Field of the Invention

The present invention relates to an internal combustion engine and, more particularly, to a torch-ignition type internal combustion engine having a pre-combustion or trap chamber for the torch-ignition of a charge of an air-fuel mixture fed into a main combustion chamber of the engine.

2. Description of the Prior Art

Torch-ignition internal combustion engines of the type referred to above were already known in the art. This type of internal combustion engines has its maximum merit in that the production of harmful components at the stage of the combustion of an air-fuel mixture is minimized. For this purpose, the internal combustion engines of the type concerned have heretofore been provided with various arrangements and constructions. The torch-ignition internal combustion engines having any of these arrangements and constructions had a common and general characteristics that the engine performance was greatly influenced by the shape of the trap chamber, the size and orientation of a torch aperture or aperture and the position of a set of electrodes of a spark plug. The factors of the engine performance which were influenced most were the ignitability and torch effect.

In the prior art torch-ignition type internal combustion engines, it was usual that the trap chamber was provided with a single torch aperture disposed at the end thereof adjacent to the main combustion chamber and open to the main combustion chamber whereas a set of electrodes of a spark plug was disposed within the trap chamber at the inner part thereof remote from the torch aperture. Any thoughtful consideration was not made with respect to the positional relationship between the torch aperture and the plug electrodes.

It is the inventors' understanding that, with the positioning of the plug electrodes employed in the prior art, the residual gases produced in the preceding combustion stroke and retained in the trap chamber were forced into the inner part of the trap chamber by an air-fuel mixture introduced through the torch aperture into the trap chamber by the upward movement of the piston on compression stroke. At the ignition time, the residual gases were thus retained in the inner part of the trap chamber to form a stratum in the vicinity of the plug electrodes, which presumably adversely affected the spark-ignition of the mixture in the trap chamber. It was observed by the inventors that the ignitability was decreased particularly at a light-load engine operating condition with a resultant poor engine drivability.

With the positioning of the plug electrodes of the prior art, moreover, the front face of the combustion flame produced by a spark-ignition in the trap chamber proceeded from the inner part thereof toward the torch aperture on the combustion stroke. Thus, the amount of the air-fuel mixture which existed between the trap chamber inner part and the torch aperture was forced out of the trap chamber through the torch apertures by the combustion flame while the mixture was still in the unburnt state with a result that the torch effect was very small or low.

SUMMARY OF THE INVENTION

It is an object of the present invention to provide an improved torch-ignition internal combustion engine.

It is another object of the present invention to eliminate the above-discussed difficulties of the prior art torch-ignition internal combustion engines and improve the ignitability and torch effect for thereby reliably reducing the emission of harmful exhaust gas components.

The present invention provides an improvement in an internal combustion engine of the type which includes a cylinder block defining therein a cylinder bore, a piston reciprocally mounted in the cylinder bore, a cylinder head mounted on the top of the cylinder block to cooperate with the cylinder bore and the piston to define a main combustion chamber, the cylinder head defining therein an intake port connected to the main combustion chamber, an intake valve for controlling the communication between the main combustion chamber and the intake port, the main combustion chamber receiving a charge of an air-fuel mixture from the intake port on an intake stroke of the engine, a trap chamber being in communication with the main combustion chamber and adapted to retain therein an amount of an air-fuel mixture during a succeeding compression stroke of the engine, and a spark plug for causing a combustion of the mixture in the trap chamber to cause a torch-ignition of the mixture in the main combustion chamber on a succeeding combustion stroke, the trap chamber being scavenged during an intake stroke of a succeeding cycle of the engine operation. The improvement according to the present invention comprises a plurality of torch apertures through which the trap chamber is communicated with the main combustion chamber and a feature that the spark plug is mounted such that the electrodes of the spark plug are disposed within the main combustion chamber and adjacent to that end of at least one of the torch apertures which is open to the main combustion chamber.

By the improved feature of the present invention, a part of the mixture fed into the main combustion chamber during the intake stroke is forced through the torch apertures into the trap chamber on a succeeding compression stroke to urge any residual gases in the main and trap chamber toward the inner part of the trap chamber remote from the main combustion chamber whereby the plug electrodes are substantially free from any residual gases and surrounded by the fresh mixture fed into the main combustion chamber. This greatly improves the spark-ignitability of the mixture. The spark-ignition produces a fire or combustion flame in the main chamber which propagates on one hand within the main chamber and on the other hand runs through the torch aperture adjacent to the plug electrodes into the trap chamber and toward the inner part of the trap chamber to cause a combustion of the mixture therein whereby a combustion flame is produced in the trap chamber and spurts therefrom through all of the torch apertures into the main combustion chamber to form strong torch jets for the torch-ignition of the mixture therein. The plug electrode positioning according to the present invention decreases the amount of an unburnt mixture forced out of the trap chamber through the torch apertures into the main combustion chamber and prolongs the duration of torch jets with a result that the torch effect is greatly improved.

BRIEF DESCRIPTION OF DRAWINGS

Similar parts are designated by similar reference numerals throughout the drawings.

DESCRIPTION OF PREFERRED EMBODIMENTS

Figure 1:
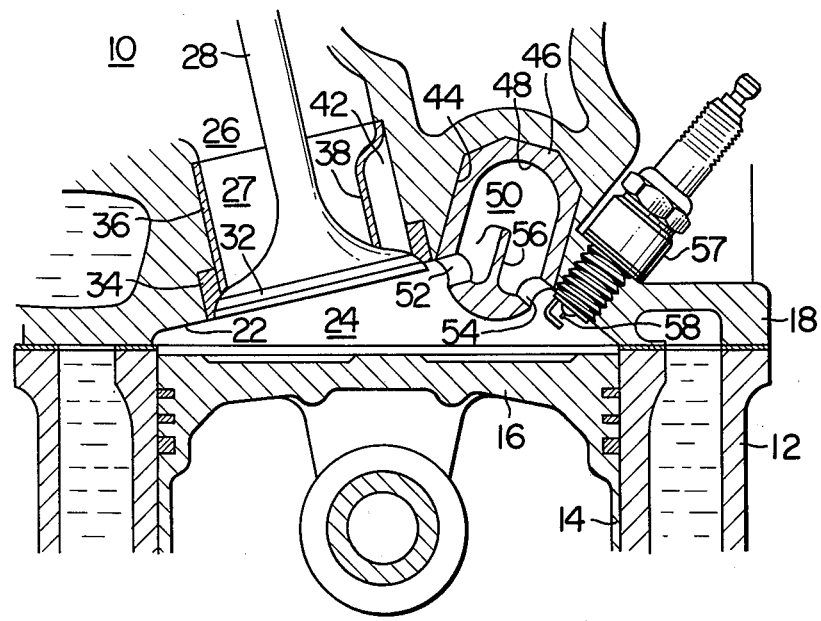
FIG. 1 is a fragmentary sectional side elevation of a first embodiment of an internal combustion engine according to the present invention.

Referring first to FIG. 1, an embodiment of the internal combustion engine according to the present invention is generally designated by reference numeral 10 and includes a cylinder block 12 defining therein cylinder bores one of which is shown and designated by 14. A piston 16 is reciprocally mounted in the cylinder bore 14. A cylinder head 18 is secured to the top of the cylinder block 12 and has a bottom or inner face in which is formed a recess 22 which cooperates with the top of the piston 16 to define a main combustion chamber 24. The cylinder head 18 defines therein an intake port 26 having a downstream end connected to the main combustion chamber 24. An intake valve 28 having a valve head 32 is reciprocally mounted on the cylinder head 18 to cooperate with a valve seat 34 to control the communication between the intake port 26 and the main combustion chamber 24 in well-known manner. A generally cylindrical insert 36 is fitted into the downstream end of the intake port 26 and is inwardly deformed at 38 to provide a recess in the outer peripheral surface of the insert 36. The deformed part 38 of the insert 36 acts as a partition which divides the downstream end portion of the intake port 26 into main and auxiliary passages 27 and 42 for lean and rich air-fuel mixtures produced by main and auxiliary carburetors (not shown), respectively. The communications of the main and auxiliary intake passages 26 and 42 with the main combustion chamber 24 are both simultaneously controlled solely by the intake valve 28.

The cylinder head 18 is formed with a hole or bore 44 which is open in the surface of the recess 22 adjacent to the downstream end of the auxiliary intake passage 42. A hollow trap-chamber insert 46 is press-fitted into the hole 44. The insert 46 has a substantially smoothly continuous inner surface 48 which defines a trap chamber 50. The insert 46 has a hemispherical outer end which protrudes into the main combustion chamber 24 and in which a pair of torch apertures 52 and 54 are formed to communicate the trap chamber 50 with the main combustion chamber 24. One of the torch apertures 52 is located adjacent to the downstream end of the auxiliary intake passage 42 and directed such that, when the intake valve 28 is moved to its fully open positioned, the torch aperture 52 is positioned on the side of the valve head 32 adjacent to the valve seat 34 so that a charge of an air-fuel mixture, which mainly consists of an amount of the rich air-fuel mixture from the auxiliary intake passage 42, is guided by the back face of the valve head 32 toward and through the torch aperture 52 into the trap chamber 50. For this reason, the aperture 52 may be termed "suction aperture". The other or second torch aperture 54 is remote from the aperture 52 and has an axis substantially parallel to the surface of the recess 22 adjacent to the aperture 54. The axis extends in a direction different from that of the axis of the first aperture 52.

From the portion of the inner surface 48 of the trap-chamber insert 46 adjacent to the hemispherical outer end thereof and between the two apertures 52 and 54, a guide wall 56 extends substantially to the center of the trap chamber 50 to divide the outer part of the trap chamber 50 (which is adjacent to the outer hemispherical end of the trap-chamber insert 46) into two sections, one of which is adjacent to the first torch aperture 52 and the other of which is adjacent to the second torch aperture 54 so that the two torch apertures 52 and 54 are communicated with each other through the inner part of the trap chamber 50 which is remote from the torch apertures 52 and 54.

A spark plug 57 is removably mounted on the cylinder head 18 at a point adjacent to the trap chamber 50 and has a set of electrodes 58 disposed in the main combustion chamber 24 adjacent to that end of the second torch aperture 54 which is open to the main combustion chamber 24 so that the spark plug 57 is electrically energized to ignite that part of the air-fuel mixture which is located adjacent to the end of the second torch aperture 54 open to the main combustion chamber 24 about the end of a compression stroke.

In operation, when the intake valve 28 is moved to its open position on an intake stroke, the downward movement of the piston 16 is operative to supply the main combustion chamber with a charge of an air-fuel mixture which chiefly consists of an amount of the lean air-fuel mixture from the intake port 26. At this time, the rich mixture from the auxiliary intake passage 42 is guided by the back face of the valve head 32 mainly toward the first torch aperture 52 through which the rich mixture flows into the trap chamber 50. The fresh rich mixture is guided in the trap chamber by the guide wall 56 to the inner part of the trap chamber. At this part of the chamber 50, the mixture is guided and turned by the hemispherical, concave inner end portion of the inner surface 48 of the trap chamber 50 toward the second torch aperture 54. A part of the mixture flows through the torch aperture 54 from the trap chamber 50 to a point of the main combustion chamber 24 which is adjacent to the end of the torch aperture 54 open to the main chamber 24. The flow of the fresh rich mixture through the trap chamber reliably sweeps away and discharges from the trap chamber the residual gases produced therein during the preceding combustion stroke. Thus, the trap chamber 50 and the electrodes 58 of the spark plug 57 are effeciently scavenged and are now filled with and surrounded by the fresh rich mixture.

On a succeeding compression stroke, the lean mixture in the main combustion chamber 24 is compressed by the upward movement of the piston 16. A part of the compressed lean mixture is forced through the first and second torch apertures 52 and 54 into the trap chamber 50 and urges the rich mixture and residual combustion gases, if any, toward the inner end of the trap chamber 50 while the lean mixture part is mixed with the rich mixture and the residual gases in the trap chamber. As a result, a fresh mixture exists adjacent to the plug electrodes 58 and adjacent to the end of the second torch aperture 54 open to the main combustion chamber 24. At least it is avoided that a large amount of residual gases exists around the plug electrodes 58 at the end of the compression stroke.

About the end of the compression stroke, the spark plug 57 is electrically energized to produce a spark discharge for the ignition of the air-fuel mixture. The spark plug 57 initially ignites that part of the air-fuel mixture which is present in the main combsution chamber 24 at the point adjacent to the opening of the second torch aperture 54 to the main combustion chamber 24, the plug electrodes being disposed at that point. Because that part of the mixture is a fresh mixture as discussed above, the mixture part can reliably be ignited by the spark plug 57. The ignition produces a combustion flame or fire which propagates and spreads toward remote points of the main combustion chamber as well as into the trap chamber 50 through the second torch aperture 54. It will be appreciated that, because the trap chamber is filled mainly with the rich mixture, the fire propagates at a higher velocity in the trap chamber 50 than in the main combustion chamber 24 with a resultant abrupt pressure build-up in the trap chamber 50. Thus, the fire in the trap chamber runs through both torch apertures 52 and 54 into the main combustion chamber 24 to form torch jets. The guide wall 56 functions to guide the initial fire toward the inner end of the trap chamber 50, so that the fire grows toward the inner end of the trap chamber while the energy of the fire is progressively increased, with a resultant production of strong torch jets. The torch jets continue to run for a long period of time. The production of the torch jets expels only a small amount of unburnt air-fuel mixture from the trap chamber 50 into the main chamber 24. These facts in combination with the fact that the trap chamber 50 is filled with a readily combustible mixture contribute to the production of strong torch jets. The lean mixture in the main combustion chamber 24 is thus reliably ignited by the strong torch jets and is burnt at a high burning velocity.

The improvements in the ignitability and in the torch effect as discussed above assure an improved purification of the engine exhaust gases without any reduction or decrease in the efficiency of combustion to thereby ensure a good engine performance.

Figure 2:
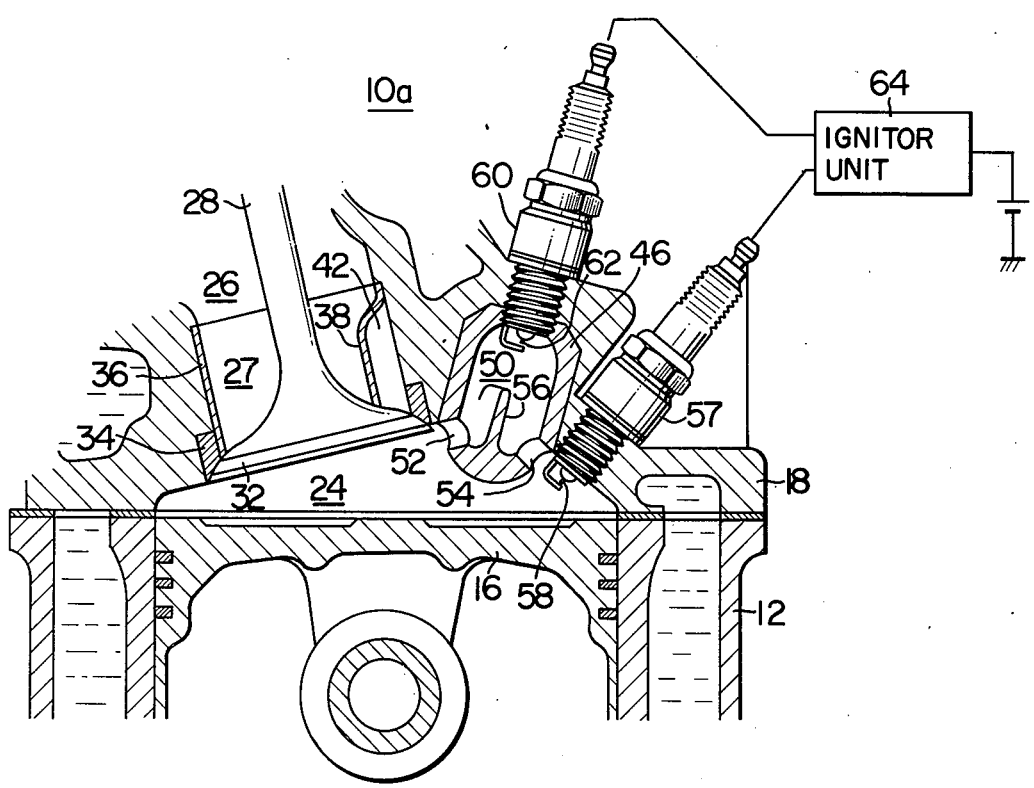
FIG. 2 is a similar view but illustrates a modification of the first embodiment shown in FIG. 1.

FIG. 2 illustrates a modified internal combustion engine 10a. The modification comprises a second spark plug 60 removably mounted on the cylinder head 18 in addition to the first spark plug 57 mounted on the cylinder head 18 as in the embodiment shown in FIG. 1. The second spark plug 60 has a set of electrodes 62 extending into the trap chamber 50 and disposed in the inner part of the trap chamber at a point remote from the torch apertures 52 and 54. Both spark plugs 57 and 60 are electrically energized by an ignitor unit 64 to produce spark discharges throughout all the operating conditions of the engine. The ignitor unit 64 per se is not shown in its structural detail but may be of any conventional type which electrically energizes the two spark plugs 57 and 60 simultaneously or sequentially with a certain time lag.

The provision of the two spark plugs 57 and 60 assures a further improved and reliable spark-ignition in the engine 10a. Namely, in a light-load engine operating condition or a slow-speed engine operating condition where the electrodes 62 of the second spark plug 60 are exposed to a relatively large amount of residual gases in the trap chamber 50 with a resultant decrease in the reliability of the spark-ignition by the second spark plug 60, the electrodes 58 of the first spark plug 57 are surrounded by a fresh air-fuel mixture at each ignition time and thus are surely operative to reliably ignite the fresh mixture to cause a fire with a resultant production of strong torch jets, as described with reference to FIG. 1. On the other hand, in a heavy-load engine operating condition or a high-speed engine operating condition where the electrodes 58 of the first spark plug are exposed to a high-speed flow of the mixture within the main combustion chamber and the igniting spark is liable to be blown out by the high-speed mixture flow, the flow or movement of the fresh mixture in the trap chamber 50 is limited to a relatively low speed and thus the second spark plug 60 is surely operative to reliably ignite the mixture in the trap chamber 50 to produce a fire therein at its inner-most end. The fire spreads outwardly in the trap chamber 50 to cause an abrupt pressure build-up therein with a resultant production of strong torch jets running through the torch apertures 52 and 54 into the main combustion chamber 24 to ignite the lean mixture therein as in the case of the spark-ignition by the first spark plug 57.

In other engine operating conditions, both spark plugs 57 and 60 are operative to reliably ignite the mixtures in the main and trap chambers 24 and 50. The improved spark-ignition according to the present invention is by no means adversely affected by a sequential ignition timing for the two spark plugs 57 and 60.

Figure 3:
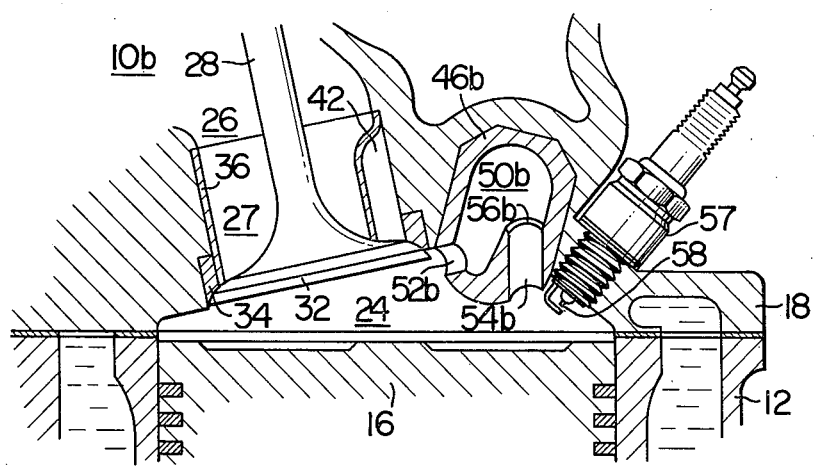
FIG. 3 is a similar view but illustrates a second embodiment of the present invention.

FIG. 3 illustrates a second embodiment of the invention generally designated by reference numeral 10b. The embodiment 10b is different from the first embodiment in that the second embodiment 10b is provided with a modified trap-chamber insert 46b defining therein a trap chamber 50b and provided with first and second torch apertures 52b and 54b, as in the first embodiment. The difference is that, instead of a flat guide wall as used in the first embodiment, the modified trap-chamber insert 46b has a bank 56b having a generally semicircular or arcuate crosssection and extending a distance into the trap chamber 50b along the inner peripheral side wall of the trap chamber adjacent to the second torch aperture 54b. The arcuate bank 56b and an adjacent wall portion of the trap-chamber insert 46b cooperate to surround or define the second torch aperture 54b.

The embodiment 10b is provided with a single spark plug 57 having a set of electrodes 58 disposed in the main combustion chamber 24 adjacent to the outer end of the second torch aperture 54b, as in the first embodiment shown in FIG. 1. The embodiment 10b is operative in a manner similar to that of the first embodiment. The bank 56b functions to facilitate propagation of the initial fire or combustion flame through the second torch aperture 54b toward the inner end portion of the trap chamber 50b for the improved torch effect, as discussed in connection with the first embodiment.

Figure 4:
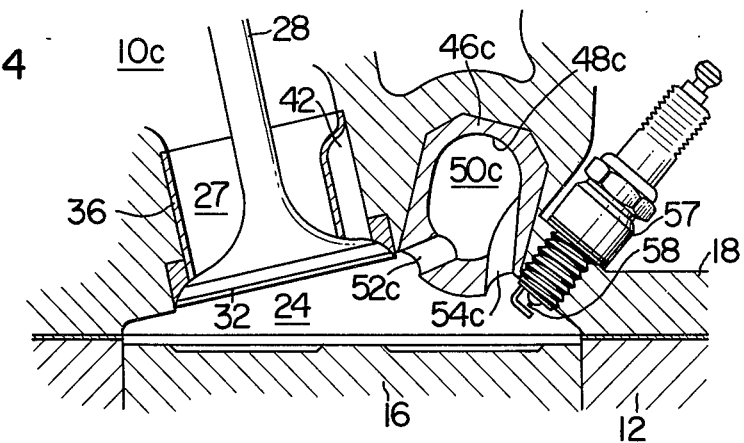
FIG. 4 is a similar view but illustrates a third embodiment of the present invention.

FIG. 4 illustrates a third embodiment of the invention generally designated by reference numeral 10c. This embodiment 10c is provided with a further modified trap-chamber insert 46c having an inner peripheral surface 48c which defines a trap chamber 50c and which is smoothly continuous over substantially all the surface areas thereof. No guide wall extends into the trap chamber 50c and, instead, first and second torch apertures 52c and 54c extend through the wall of the trap-chamber insert 46c substantially tangentially to the inner peripheral surface 48c. A set of electrodes 58 of a single spark plug 57 is disposed in the main combustion chamber 24 adjacent to the outer end of the second torch aperture 54c, as in the preceding embodiment.

With the arrangement of the third embodiment 10c, a charge of fresh air-fuel mixture frows through the first torch aperture 52c into the trap chamber 50c substantially tangentially to the inner peripheral surface 48c of the insert 46c during a suction or intake stroke. The flow of the mixture in the trap chamber 50c is guided by the smoothly continuous peripheral surface 48c to form a loop in the trap chamber 50c. Thus, the mixture flows through and over substantially all points of the trap chamber 50c and reaches the second torch aperture 54c to reliably scavenge the trap chamber. On a succeeding compression stroke, a part of the lean mixture in the main combustion chamber 24 is forced through both torch apertures 52c and 54c into the trap chamber 50c to produce a vortex flow therein which facilitates homogenization of mixtures and any residual combustion gases in the trap chamber for improved combustion and torch effect. It is to be particualrly noted that propagation and growth of the initial combustion flame through the second torch aperture 54c toward the inner part of the trap chamber 50c are greatly facilitated by the tangential direction of the second torch aperture 54c relative to the inner peripheral surface 48c of the trap-chamber insert 46c.

The third embodiment 10c may be modified such that the spark plug 57 is replaced by a similar spark plug (not shown) having a set of electrodes disposed within the main combustion chamber 24 adjacent to the end of the first torch aperture 52b open to the main chamber 24, which provides a similar result.

Figure 5:
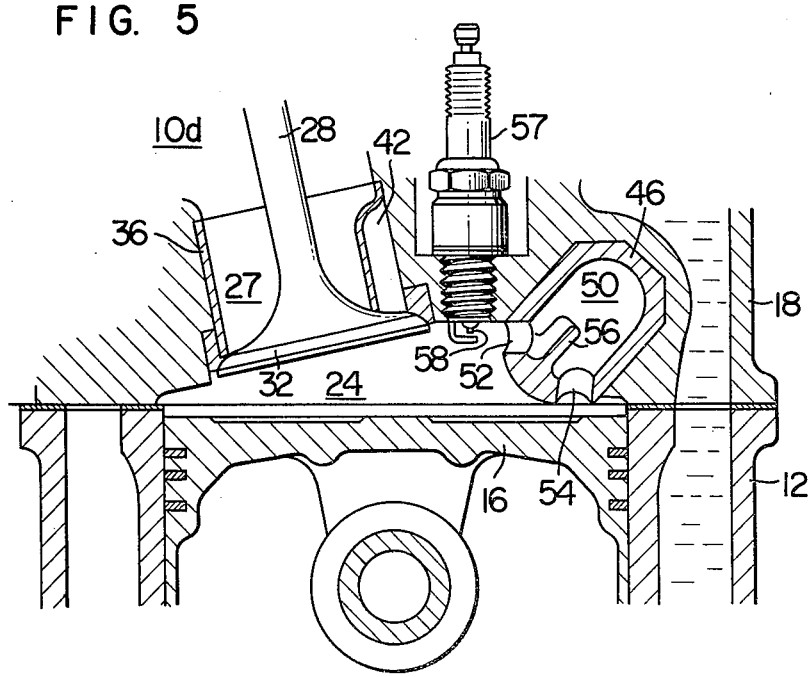
FIG. 5 is a similar view but illustrates a fourth embodiment of the present invention.

Referring to FIG. 5, a fourth embodiment of the invention generally designated by reference numeral 10d is provided with a trap-chamber insert 46 which is identical in structure to the trap-chamber insert used in the first embodiment shown in FIG. 1 and which defines a trap chamber 50 and first and second torch apertures 52 and 54 as in the first embodiment. A single spark plug 57 is removably mounted on the cylinder head 18 such that a set of electrodes 58 is disposed in the main combustion chamber 24 adjacent to the end of the first torch aperture 52 open to the main chamber 24. The first torch aperture 52 is the aperture through which a fresh charge of an air-fuel mixture is introduced into the trap chamber 50 during a suction stroke, as in the preceding embodiments of the invention.

Figure 6:
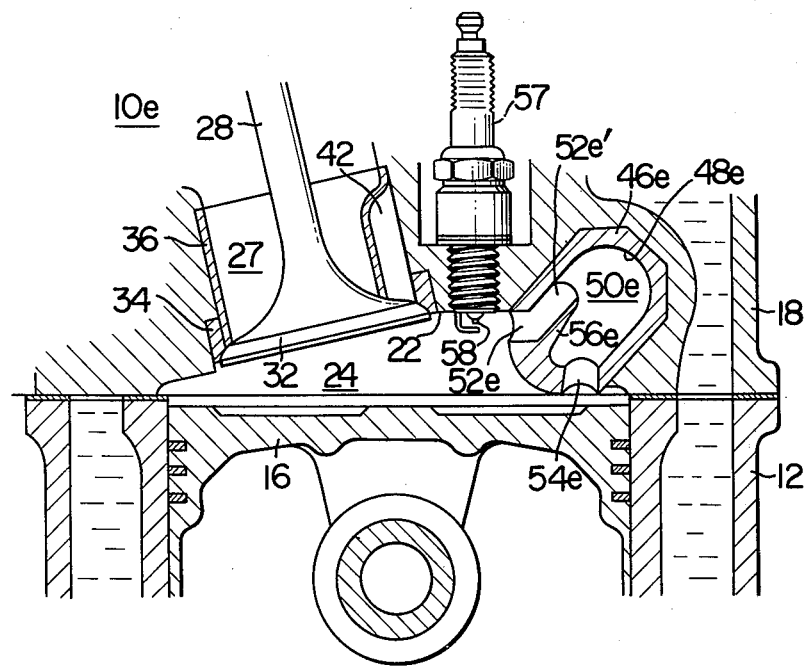
FIG. 6 is a similar view but illustrates a fifth embodiment of the invention.

FIG. 6 illustrates a fifth embodiment of the invention generally designated by reference numeral 10e, in which a trap chamber 50e and first and second torch apertures 52e and 54e are defined in a further modified trap-chamber insert 46e having a bank 56e having a generally arcuate cross-section and extending a distance into the trap chamber 50e along the inner peripheral surface 48e of the insert 46e adjacent to the first torch aperture 52e. The arcuate bank 56e cooperates with the inner peripheral surface 48e to define an extension 52e' of the first torch aperture 52e connected thereto and extending therefrom into the trap chamber 50e along the inner peripheral surface 48e. The extension 52e' of the first torch aperture 52e is operative to guide an air-fuel mixture from the inlet part of the first torch aperture 52e toward the inner part of the trap chamber 50e. A single spark plug 57 is mounted on the cylinder head 18 such that the electrodes 58 of the plug are disposed in the main combustion chamber 24 adjacent to the end of the first torch aperture 52e adjacent to the main chamber, as in the embodiment shown in FIG. 5.

The fourth and fifth embodiments shown in FIGS. 5 and 6 are operative substantially as in the first and second embodiments.

The internal combustion engines 10 to 10e described above are all of the type that is provided with an auxiliary or rich mixture passage 42 through which a rich air-fuel mixture produced by an auxiliary carburetor is supplied into a trap chamber. The present invention, however, is not limited to this type of internal combustion engine and may be applied to another type of engine which is provided with another type of rich mixture supplying means, such as a fuel injection nozzle, for example.

Figure 7:
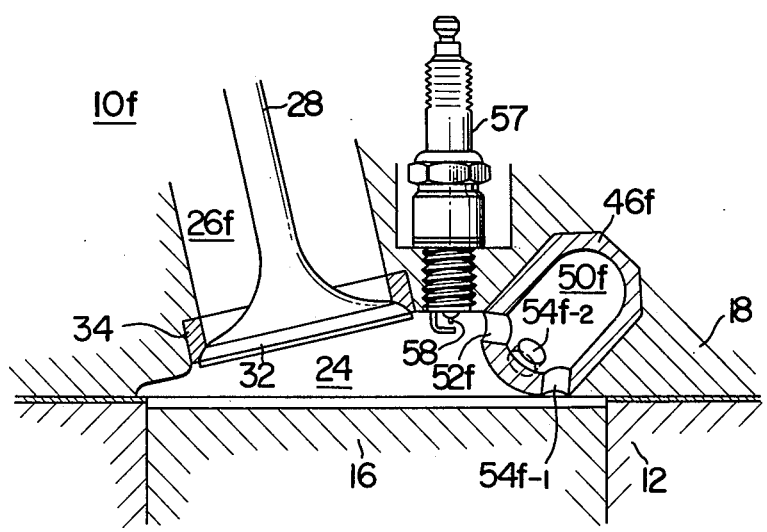
FIG. 7 is a similar view but illustrates a sixth embodiment of the present invention.

FIG. 7 illustrates a sixth embodiment of the invention generally designated by reference numeral 10f, in which a homogeneous air-fuel mixture is supplied through a single intake port 26f into both main combustion chamber 24 and trap chamber 50f. The embodiment is not provided with any rich mixture supply means such as a rich mixture passage. The trap chamber 50f is defined in a still further modified trap-chamber insert 46f having three torch apertures 52f, 54f-1 and 54f-2 having axes extending in different directions, respectively. The first torch aperture 52f is positioned relatively near to a valve seat 34 and directed toward the downstream end of the intake port 26f. A spark plug 57 is positioned such that the electrodes 58 thereof are disposed within the main combustion chamber 24 adjacent to the end of the first torch aperture 52f open to the main combustion chamber 24. The spark plug, however, is not limited to the positioning shown in FIG. 7 but may be placed such that the plug electrodes are disposed adjacent to the end of anyone of the second and third torch apertures 54f-1 and 54f-2 open to the main chamber 24. The trap chamber 50f is supplied with a mixture during an intake stroke as in the preceding embodiments.

As will be apparent from the sixth embodiment, the present invention may also be applied to an internal combustion engine of the type that has a trap chamber which is not particularly intended to be supplied with a rich air-fuel mixture. In addition, the torch apertures is not limited in number to two or three and may be of any plural number.

What is claimed is:

1. In an improved internal combustion engine of the type which includes a cylinder block defining therein a cylinder bore, a piston reciprocally mounted in said cylinder bore, a cylinder head mounted on the top of said cylinder block to cooperate with said cylinder bore and said piston to define a main combustion chamber, said cylinder head defining therein an intake port connected to said main combustion chamber, an intake valve for controlling the communication between said main combustion chamber and said intake port, said main combustion chamber receiving a charge of an air-fuel mixture from said intake port on an intake stroke of said engine, a trap chamber being in communication with said main combustion chamber and adapted to retain therein an amount of an air-fuel mixture during a succeeding compression stroke of said engine, and a spark plug for causing a combustion of the mixture in said trap chamber to cause a torch-ignition of the mixture in said main combustion chamber on a succeeding combustion stroke, said trap chamber being scavenged during an intake stroke of a succeeding cycle of engine operation, the improvement which comprises:

a plurality of torch apertures through which said trap chamber is communicated with said main combustion chamber; and said spark plug having a set of electrodes disposed within said main combustion chamber and adjacent to that end of at least one of said torch apertures which is open to said main combustion chamber.

2. The internal combustion engine according to claim 1, wherein said trap chamber is defined by a substantially smoothly continuous surface in which said torch apertures are open, and wherein at least one of said torch apertures has an axis substantially tangential to said smoothly continuous surface.

3. The internal combustion engine according to claim 1, wherein a part of the mixture charge supplied into said main combustion chamber is introduced through said torch apertures into said trap chamber on the compression stroke, the inner peripheral surface of said trap chamber and said torch apertures being arranged such that the mixture part introduced into said trap chamber on the compression stroke form a vortex flow therein.

4. The internal combustion engine according to claim 1, wherein said trap chamber is provided with a pair of torch apertures.

5. The internal combustion engine according to claim 1, wherein said trap chamber is provided with three torch apertures.

6. The internal combustion engine according to claim 1, further including an additional spark plug having a set of electrodes disposed within said trap chamber at the inner part thereof remote from said main combustion chamber.

7. The internal combustion engine according to claim 1, wherein the end of at least one of said torch apertures open to said main combustion chamber is so positoned and directed as to receive from the downstream end of said intake port a part of said mixture charge to said main combustion chamber during the intake stroke of said engine.

8. The internal combustion engine according to claim 7, wherein the set of electrodes of said spark plug is disposed adjacent to that end of the torch aperture which is open to said main combustion chamber, the last-mentioned torch aperture being different from the torch aperture which receives the mixture during the intake stroke.

9. The internal combustion engine according to claim 7, wherein the set of electrodes of said spark plug is disposed adjacent to that end of the torch aperture which is open to said main combustion chamber, the last-mentioned torch aperture being the torch aperture which receives the mixture on the intake stroke.

10. The internal combustion engine according to claim 1, further including a guide means extending a distance from between said torch apertures toward the inner part of said trap chamber remote from said main combustion chamber so that the ends of said torch apertures open to said trap chamber are communicated through said trap chamber inner part.

11. The internal combustion engine according to claim 10, wherein said guide means comprises a bank which at least partially surrounds the torch aperture adjacent to said plug electrodes so that the last-mentioned torch aperture is extended into the trap chamber and open thereto in the inner part thereof remote from said main combustion chamber.

12. The internal combustion engine according to claim 10, wherein said guide means comprises a substantially flat wall which divides the inner part of said trap chamber adjacent to said main combustion chamber into two sections adjacent to said torch apertures, respectively, and communicated with each other through said inner part of said trap chamber.

13. A torch-ignition internal combustion engine comprising a cylinder block defining therein a cylinder bore, a piston reciprocally mounted in said cylinder bore, a cylinder head mounted on the top of said cylinder block to cooperate with said cylinder bore and said piston to define a main combustion chamber, said cylinder head defining therein an intake port through which a charge of an air-fuel mixture is introduced into said main combustion chamber on an intake stroke of said engine, an intake valve for controlling the introduction of the air-fuel mixture charge into said main combustion chamber, a trap chamber provided with a plurality of torch apertures through which said trap chamber is communicated with said main combustion chamber during all of the time when said intake valve is closed, at least one of said torch apertures being positioned and directed relative to the downstream end of said intake port such that said one torch aperture receives from the downstream end of said intake port a part of the mixture charge to said main combustion chamber during said intake stroke, a part of the mixture charge introduced into said main combustion chamber being forced through all of said torch apertures into said trap chamber on a succeeding compression stroke of the engine, a spark plug having a set of electrodes disposed within said main combustion chamber adjacent to one of said torch apertures for spark-igniting the part of the air-fuel mixture adjacent to said plug electrodes, the spark-ignition producing a fire which propagates through the torch aperture adjacent to said plug electrodes into said trap chamber whereby the mixture in said trap chamber is burnt to produce a combustion flame therein which spurts through said torch apertures into said main combustion chamber to form torch jets therein for the torch-ignition of the mixture therein.

14. The internal combustion engine according to claim 13, wherein said intake valve has a valve head for controlling the communication between the intake port and said main combustion chamber, said valve head when in an open position guiding a part of the mixture charge to said main combustion chamber toward said at least one torch aperture to facilitate the introduction of the mixture part into said trap chamber during the intake stroke.

15. The internal combustion engine according to claim 14, further including means dividing the downstream end portion of said intake port into two passages for lean and rich air-fuel mixtures, respectively, the rich mixture passage having its downstream end positioned adjacent to said at least one torch aperture whereby, on the intake stroke of the engine, said trap chamber is supplied with a charge of a mixture which is richer than the mixture supplied into said main combustion chamber.

* * * * *